Sept. 23, 1952 M. CAMRAS 2,611,618

TAPE AND DISK RECORDING AND REPRODUCING DEVICE

Filed June 1, 1946 4 Sheets-Sheet 1

Inventor
Marvin Camras by Attys

Sept. 23, 1952 M. CAMRAS 2,611,618

TAPE AND DISK RECORDING AND REPRODUCING DEVICE

Filed June 1, 1946 4 Sheets-Sheet 2

Inventor
Marvin Camras by The Firm of Charles W. Hills

Attys

TAPE AND DISK RECORDING AND REPRODUCING DEVICE

Filed June 1, 1946 4 Sheets-Sheet 3

Inventor
Marvin Camras by [signature] Attys

TAPE AND DISK RECORDING AND REPRODUCING DEVICE

Filed June 1, 1946 4 Sheets-Sheet 4

INVENTOR.
Marvin Camras
BY
[signature]
ATTYS.

Patented Sept. 23, 1952

2,611,618

UNITED STATES PATENT OFFICE 2,611,618

TAPE AND DISK RECORDING AND REPRODUCING DEVICE

Marvin Camras, Chicago, Ill., assignor to Armour Research Foundation of Illinois, Institute of Technology, Chicago, Ill., a corporation of Illinois Application June 1, 1946, Serial No. 673,740

3 Claims. (Cl. 274—8)

This invention relates to a sound recording and reproducing device, and more particularly, to a combination magnetic recording and reproducing device with a disk record spiral groove type reproducing device.

One of the principal features and objects of the present invention is to provide a simple and inexpensive sound recording and reproducing device which will play both magnetic records recorded on an elongated traveling record medium, as well as to play records of the conventional disk type.

A further object of the present invention is to provide a novel combination magnetic recording and reproducing device with a disk record type reproducing device in which the turntable serves the dual purpose of carrying a disk record as well as the take-up spool for the elongated magnetic record member.

Still another object of the present invention is to provide a novel drive mechanism for sound recording and reproducing devices.

Another and still further object of this invention is to provide a novel winding and reeling mechanism for a magnetic recording and reproducing device.

Still another and further object of the invention is to provide novel slip clutches or brakes for a winding and reeling mechanism.

The novel features which I believe to be characteristic of my invention are set forth with particularity in the appended claims. My invention itself, however, both as to its organization, manner of construction and method of operation, together with further objects and advantages thereof, may best be understood by reference to the following description, taken in connection with the accompanying drawings, in which:

Figure 1:
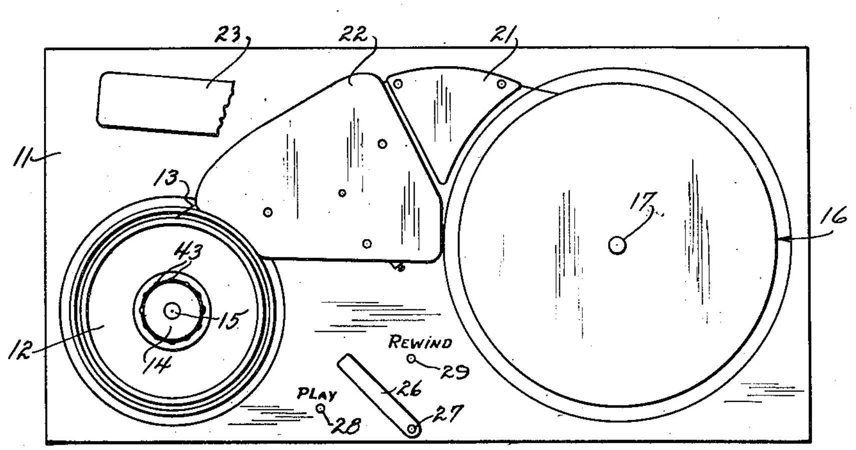
Figure 1 is a plan view of a sound recording and reproducing device embodying the novel principles and teachings of the present invention.
Figure 2:
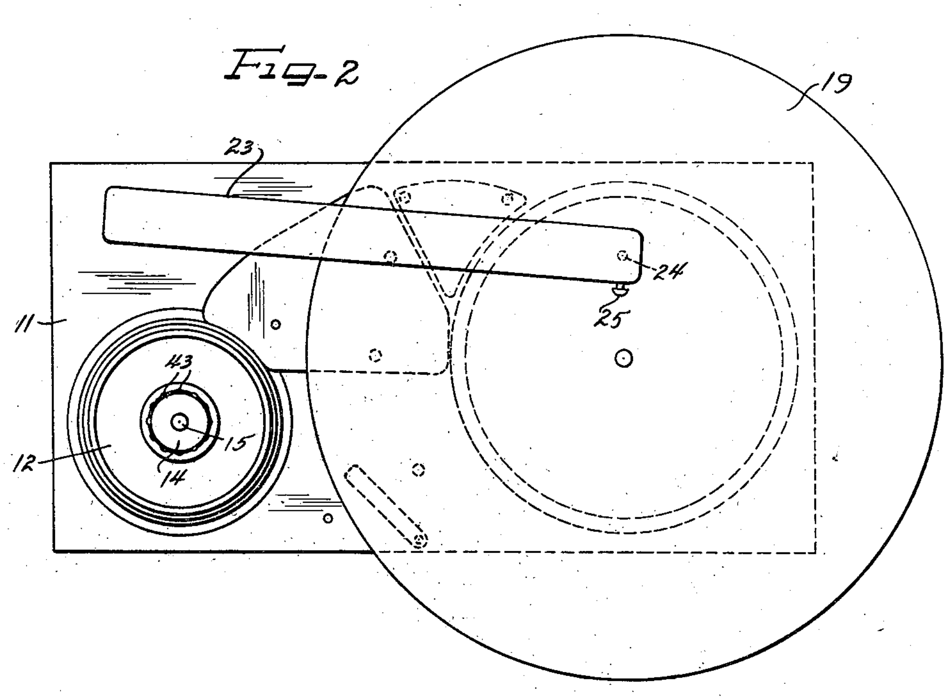
Figure 2 is a view similar to Figure 1 but with a disk record in place on the turntable.

In Figures 1 to 8 of the drawings, I have illustrated the essential mechanical mechanism of one embodiment of my novel sound recording and reproducing device. As may best be seen in Figures 1, 2 and 3, the structure includes a base plate 11 which is arranged to be mounted in any conventional radio and which is somewhat similar in size and shape to the base plate of a conventional automatic record changer. On the base plate 11 a take-off spool 12, upon which the wire 13 is normally stored, is mounted for rotation on the hub 14 carried by the shaft 15. The wire 13 is illustrative of any elongated record member and is formed, at least in part, of a material of relatively high coercive force in order that magnetic records may be retained thereon.

On the opposite side of the base 11 is a combination turntable and take-up spool 16 which is mounted for rotation on a shaft 17. This combination turntable and take-up spool 16 includes a flat upper surface 18 which is preferably covered with a felt mat 18' upon which the record 19 rests when it is slipped over the end of the shaft or spindle 17.

The combination turntable and take-up spool 16 also includes an outwardly facing channel portion 20 in its outer peripheral edge which is arranged to receive an elongated record member 13 and be wound thereon. Disposed between the supply spool 12 and the take-up spool and turntable 16 is a magnetic transducer head 21 over which the wire 13 passes. This magnetic transducer head 21 as will hereinafter be referred to in discussing the electrical circuit of the present apparatus is arranged to either act as a magnetic pick-up head or as a magnetic recording and erase head. Disposed between the magnetic transducer head 21 and the supply spool 12 is a housing 22 which contains an automatic stop mechanism for shutting off the apparatus when either end of the wire 13 passes therethrough. Since the automatic stop mechanism forms no part of the present invention, it has not been illustrated in detail, but is described and claimed in my copending application, Serial No. 648,425, entitled "Automatic Stop for Magnetic Recorder,"

filed February 18, 1946, now Patent No. 2,572,985, issued October 30, 1951.

In addition to the magnetic transducer head 21, a conventional tone arm 23 is provided for cooperation and use with the disk record 19 when such is to be played. It will be understood that this tone arm 23 carries a needle 24 which is retained in the end of the tone arm by a set screw 25.

A control arm 26 is rigidly secured to a rotatable shaft 27 and is arranged to be moved into engagement with a stop pin 28 when it is desired to rotate the combination turntable and take-up spool 16 in a clockwise direction, and into engagement with a stop pin 29 when it is desired to rotate the supply spool 12 in a counter-clockwise direction (for rewinding).

Figure 3:
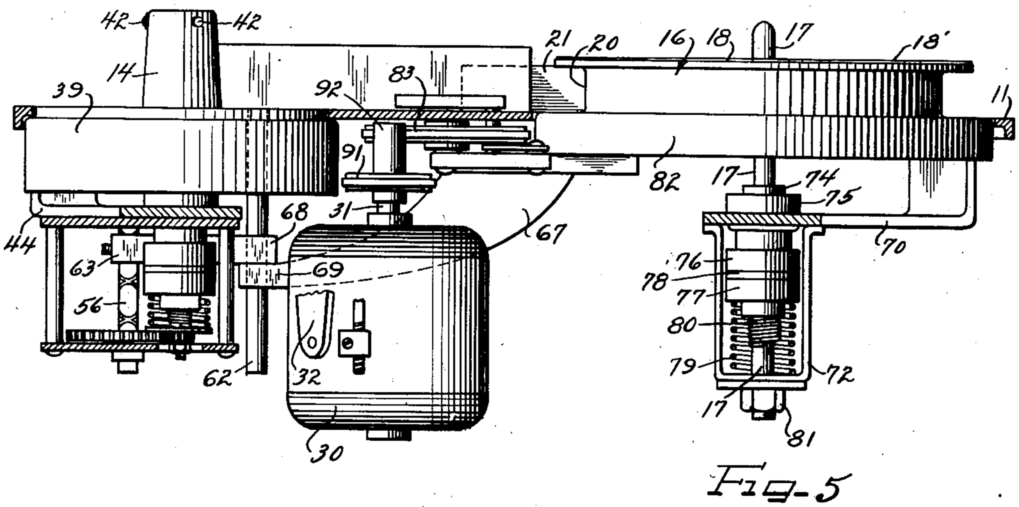
Figure 3 is an elevational view of the mechanism shown in Figure 1 with certain parts broken away.
Figure 4:
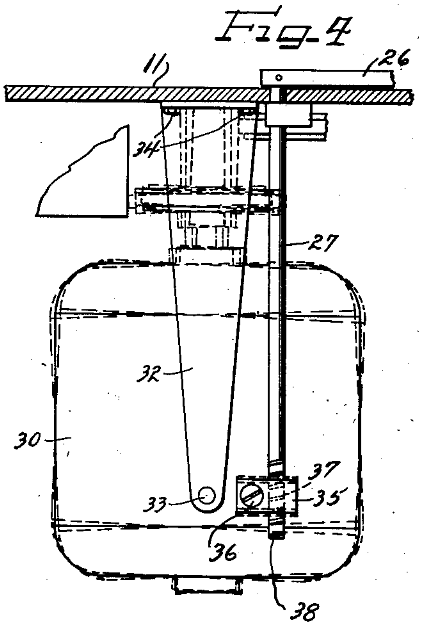
Figure 4 is an enlarged elevational view of the tiltable motor and its associated mounting structure.

As may be seen best in Figures 3 and 4, a motor 30 is provided for driving the rotating mechanism of the device. This motor 30 is mounted for rotation of its armature shaft 31 about substantially a vertical axis. To this end, the motor 30 is pivotally supported in a pair of depending arms 32 by pins 33, the arms 32 being secured to the base plate 11 by screws 34. The control arm shaft 27 which carries the control arm 26 extends down alongside of the motor 30 and into threaded engagement with an ear 35 which is secured to the motor casing by a bolt 36. The ear 35 is apertured and threaded as at 37 to receive the threaded end 38 of the shaft 27. It will thus be understood that when the arm 26 is moved from engagement with one stop pin into engagement with the other stop pin 29, the motor is rocked about its trunnions 33 which support it on the depending arms 32. As will presently be explained, this rocking movement of the motor 30 determines whether the combination take-up spool and turntable 16 is to be driven or whether the hub 14 which carries the supply spool is to be driven.

Figure 5:
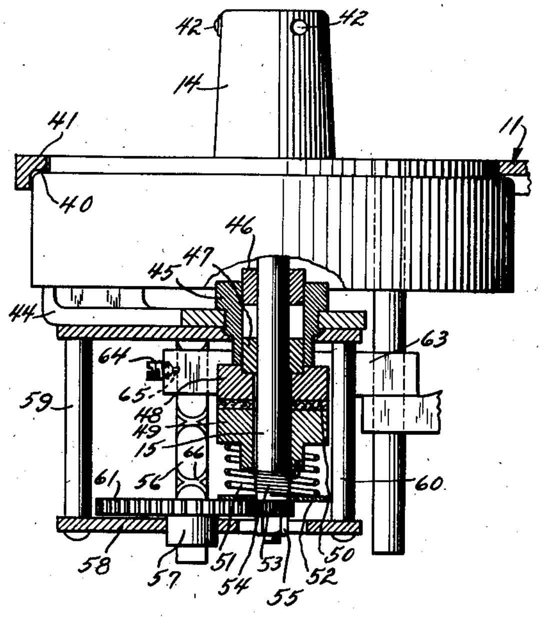
Figure 5 is an enlarged view of the supply spool spindle and one-way brake mechanism, the latter being shown in vertical section.

The mounting mechanism of the hub 14 may be seen best in Figures 3 and 5 of the drawings. The hub 14 is formed as an integral part of a drum 39 which is provided with an offset shoulder 40 at its upper edge which is arranged to lie just below the lip 41 of the base plate 11. In order that the spool 12 may be quickly and easily slipped over the hub 14, the hub 14 is slightly tapered as is clearly shown in the drawings. A plurality of spring-pressed balls 42 are retained in the upper end of the hub 14 and are arranged to engage detents 43 in the upper edge of the bore of the spool 12 (see Figure 1). These spring-pressed balls 42 cooperating with the detents 43 in the spool 12 serve not only to retain the spool on the hub 14, but also prevent relative rotation of the spool 12 with respect to the hub 14.

The support for the hub 14 is provided by a bracket or bridge member 44. The bracket or bridge member 44 supports a bearing block 45 which, in turn, carries a pair of bearings 46 and 47 through which the shaft 15 extends. A stationary brake shoe 48 is secured to the bearing supporting block 45 and this brake shoe 48 is provided with a central aperture which is slightly larger than the shaft 15. A cooperating brake shoe 49 is rotatably mounted on the shaft 15, and confronts the stationary brake shoe 48. Disposed between the two brake shoes 48 and 49 is a disk of suitable braking material 50. A light helical spring 51 seated on a disk 52 supported by a spur gear 53 normally urges the shoe 49 in an upward direction toward the shoe 48. A one-way brake mechanism in the form of a spiral spring 54 wrapped around the shaft 15 and secured at one end to the shoe 49 is also provided. It will be noted that the opposite end of this spring 54 is free. It should still further be observed that the spring must be wound in the direction as illustrated in Figure 5 in order that the proper braking function will be obtained on the hub 14 when the take-up spool 16 is being driven, and will run free when the hub 14 is being driven in a counter-clockwise direction as viewed in Figure 1 of the drawings. This one-way brake type of mechanism for the spring 54 tends to wrap up tighter when the shaft rotates in one direction, and tends to uncoil or ride free when the shaft is rotated in the other direction.

In order to level wind the wire on the take-up spool 16 when wire is being unwound from the supply spool 12, the magnetic transducer head 21 is moved vertically back and forth. This level winding action is obtained from a power take-off from the shaft 15. More particularly, the spur gear 53 is secured to the shaft 16 by a nut 55 which is threaded onto the lower threaded end of the shaft 15. It is to be understood that the gear 53 is secured in such a manner that it has no relative movement with respect to the shaft 15. A level wind shaft 56 having a double thread cut therein in the conventional manner is mounted in a sleeve 57 carried by a plate 58 which, in turn, is supported by a pair of depending arms 59 and 60. A gear 61 is secured to the level wind screw 56 and is enmeshed with the spur gear 53.

To one side of the drum 39 and depending from the base plate 11 is a guide pin 62. Extending between the guide pin 62 and the level wind screw 56 is an arm 63. One end of the arm 63 slides up and down on the guide pin 62 as the other end of the arm is moved up and down by rotation of the level wind screw 56. It will thus be apparent that this arm always remains in a horizontal position, but moves up and down by virtue of the rotation of the level wind screw in the left-hand end thereof as viewed in Figures 3 and 5 of the drawings.

A follower pin 64 for the double reverse helical groove of the level wind screw 56 is mounted in the end of the arm 63. As the reduced end 65 of this pin 64 is seated in the groove 66 of the level wind screw 56, the level wind screw 56 causes up and down movement of the arm 63 in the conventional manner. As may be seen best in Figures 3 and 6 of the drawings, a second arm 67 is secured to the right-hand end of the arm 63 and moves therewith. The right-hand end of the arm 63 and the left-hand end of the arm 67 lie in overlapping relationship (see Figure 3) and they are apertured as at 68 and 69 to enable the guide pin 62 to extend therethrough and to permit free sliding movement of the arms 63 and 67 on the guide pin 62.

The arm 67 extends arcuately upwardly as viewed in Figure 3 of the drawings and supports the transducer head 21 at the upper end thereof.

Figure 6:
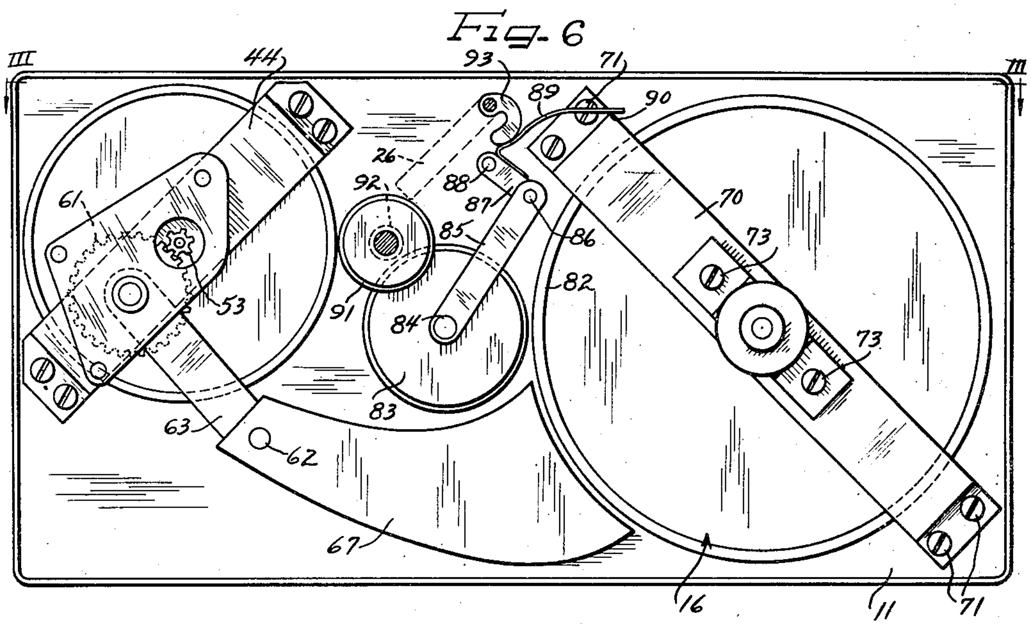
Figure 6 is an enlarged under-view of the structure shown in Figure 1.
Figure 7:
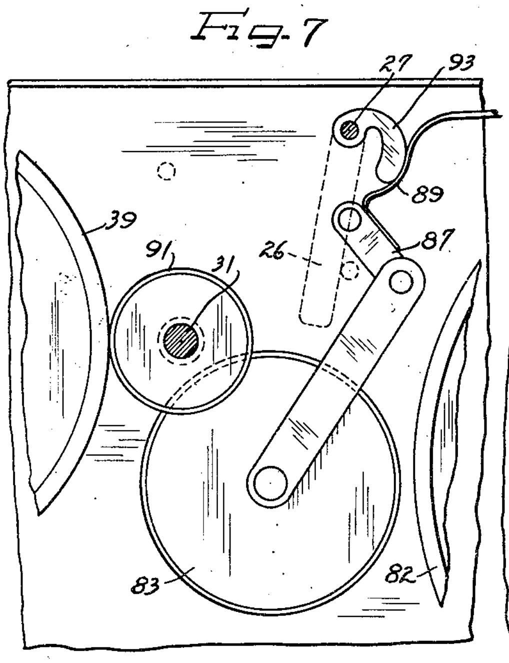
Figure 7 is an enlarged fragmentary view of the drive rolls shown in Figure 6, but in their position for rewinding the elongated record medium on the supply spool.

The support for the shaft 17 is quite similar to the support for the shaft 15 as may be seen from an inspection of Figures 3 and 6 of the drawings. A bracket or bridging member 70 is secured to the undersurface of the base plate 11 by screws 71. A second depending strap bracket 72 is secured by screws 73 to the main bridging member 70. The shaft 17 extends down through a bearing 74 which is supported in a sleeve or collar 75 which carries the upper stationary brake shoe 76. The brake shoe 76 is similar to the brake shoe 48 which is associated with the shaft 15. A spring biased lower brake shoe 77 cooperates through a disk of suitable braking material 78. The lower brake shoe 77 is spring biased in an upward direction by the helical spring 79 and is provided with a one-way grabbing coil spring 80 which has its upper end secured to the brake shoe 77 and has its lower end lying loosely on the shaft 17.

A spring adjusting nut 81 is provided opposite the end of the shaft 17. The brake shoes 76 and 77 together with the coil spring 80 cooperate in such a manner that no drag is placed on the shaft 17 when the take-up spool and turntable 16 are rotating in a clockwise direction, as viewed in Figure 1 of the drawings, but do cause a drag to be placed on the shaft 17 when the supply spool 12 is being rewound, or in other words, rotated in a counter-clockwise direction as viewed in Figure 1, so that when the wire 13 is being wound up on the drum 20 of the element 16, the lower brake shoe 77 is being held stationary against the upper brake shoe 76. When the wire 13 is being rewound onto the supply spool 12, the wire spring 80 winds tight on the shaft 17 and causes the lower brake shoe 77 to rotate with the shaft 17 against the upper brake shoe 76 which is stationary. This puts a drag on the shaft 17 and holds the wire taut across the head 21.

The cooperating brake shoes 48 and 49 associated with the shaft 15 operate in a similar manner to that described above, except in a reverse direction.

Reference has already been made to the fact that the member 16 is a combination take-up spool and turntable. The member 16 is rim-driven by providing a peripheral flange 82 which is arranged to be engaged by a rubber tired idler wheel 83 mounted for free rotation by a pin 84 on a link arm 85. The link arm 85 is hinged or pinned as at 86 to a crank arm 87 which is pivoted at 88. The crank arm 87 is actuated through an L-shape leaf spring 89 which has one leg thereof rigidly secured to the crank arm 87 and the other leg thereof sprung over the corner 90 of the downwardly depending portion of the bridge member 70.

The armature shaft 31 of the motor carries a rubber tired drive wheel 91 arranged to engage the peripheral flange or drum portion 39 of the hub 14, and it also is provided with a metal drive portion 92 which is arranged to engage the idler wheel 83.

It has already been explained that the motor 30 is arranged for limited rocking movement by angular movement of the shaft 27 about its longitudinal axis through movement of the control lever 26. It will be understood that when the control lever 26 is moved into engagement with the stop pin 28, the motor 30 is rocked to a position where the drive portion 92 is forced into engagement with the rubber tired idler wheel 83 and which, in turn, forces the rubber tired idler wheel into engagement with the peripheral flange 82 above the turntable 16, thereby to drive the turntable 16.

Similarly, when the control lever 26 is moved into engagement with the stop pin 29, the motor is rocked to a position where the rubber tired drive wheel 91 presses against the flange portion 39 of the hub 14 to drive the supply spool 12 in a rewind direction.

Also mounted on the shaft 27 is a C-shaped finger 93 which engages the leaf spring 89. The action of this C-shaped finger 93 with the leaf spring 89 is exemplified in Figures 6, 7 and 8 of the drawings. More particularly, when the shaft 27 is angularly moved about its longitudinal axis to a rewind position, the motor armature shaft 31 moves the drive wheel 91 into engagement with the peripheral flange 39 of the supply spool assembly. At the same time, the C-finger 93 depresses the central portion of the spring 89 to force the crank arm 87 in a clockwise direction as viewed in Figure 7 of the drawings. This moves the idler wheel 83 completely free and clear of both the drive shaft portion 92 as well as the peripheral flange 82 of the turntable 16 (see Figure 7). In its intermediate position, the control lever 26 still causes some depression of the free arm of the leaf spring 89, thus causing the idler wheel 83 to be free of both the drive shaft portion 92 as well as the peripheral flange 82 on the turntable 16 (see Figure 6 of the drawings).

Figure 8:
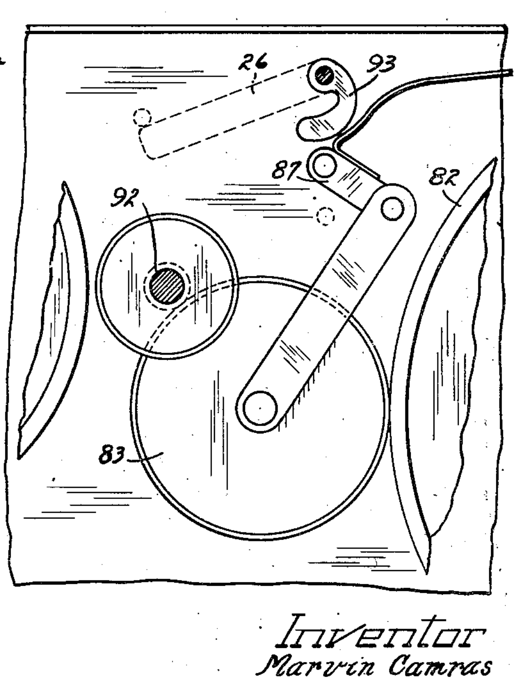
Figure 8 is a view similar to Figure 7 but showing the drive rolls in their position to drive the combination turntable and take-up spool.

When the control lever 26 is moved to its turntable drive position (as shown in Figure 8 of the drawings), the C-finger 93 is free of the free arm of the leaf spring 89 In this position, the spring pressure exerted by the leaf spring member 89 between the crank arm 87 and the corner 90 tends to draw the crank arm 87 in a counter-clockwise direction which forces the idler wheel 83 tightly between the drive shaft portion 92 and the peripheral flange 82 of the turntable 16.

Figure 9:
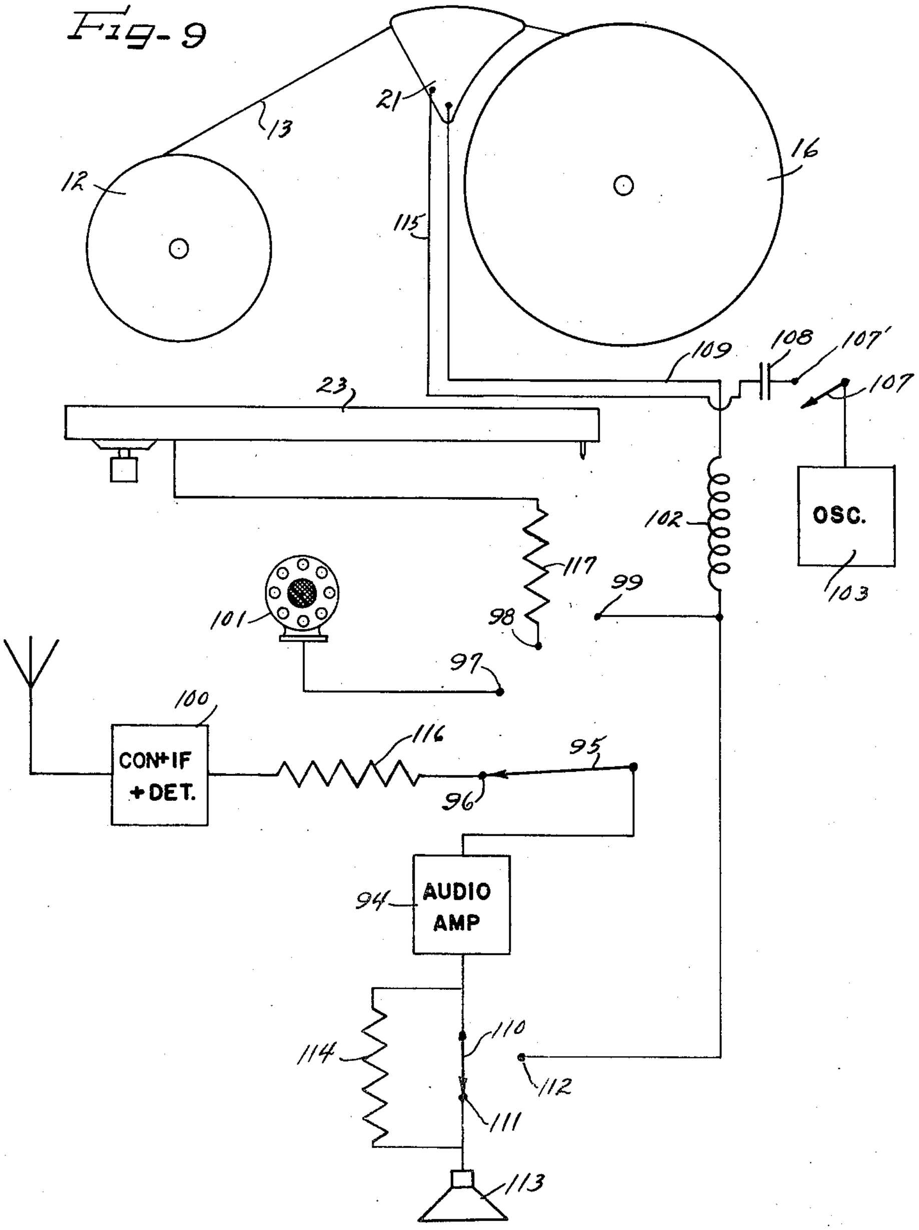
Figure 9 is a diagrammatic illustration in block diagram of the electrical circuit of the sound recording and reproducing device.

In Figure 9 of the drawings, I have illustrated diagrammatically the electrical circuit of the combination sound recording and reproducing unit. The above mechanical structure is associated with an audio-amplifier 94 whose input is connected to the movable contact arm 95 of a multi-position switch which includes, in addition to the movable contact arm 95, stationary contacts 96, 97, 98 and 99. The stationary contact 96 is connected to the output of an amplitude modulation tuner unit 100 through an attenuator resistance 116. More particularly, this is a superheterodyne tuner unit and includes conventional converter and intermediate frequency stages as well as a detector. The stationary contact 97 is connected to a microphone 101. The stationary contact 98 is connected to the crystal pick-up of the tone arm 23 through an attenuator resistance 117. The stationary contact 99 is connected through a choke coil 102 to the transducer head 21.

An oscillator 103 for use in conjunction with magnetic recording is connected through a switch 107 and a high frequency by-pass condenser 108 to the magnetic transducer 21 through conductor 115. The oscillator 103 may be of any suitable frequency which is used as a high frequency bias in the magnetic recording operation and may, by way of example, be in the neighborhood of 20 to 30 kilocycles.

The output of the audio-amplifier 94 is connected to a movable contact arm 110 of a two-position switch which also includes stationary contacts 111 and 112. Stationary contact 111 is connected to a loud speaker 113, while the stationary contact 112 is connected through the choke 102 to the magnetic transducer 21. A shunt resistance 114 extends across the switch 110 to the stationary contact 111, so that when the movable contact arm 110 is moved into engagement with stationary contact 112, some current is still fed to the loud speaker 113.

The operation of the circuit will now be described. With the switch arms 95, 107 and 110 in their position as shown in Figure 9 of the drawings the unit is operating as a conventional radio receiver. To operate the unit as a public address system, the switch arm 95 is moved into engagement with the microphone contact 97. If the unit is to be operated as a conventional record player, the movable contact arm 95 is moved into engagement with the stationary contact 98 which is connected to the tone arm 23. The pick-up of the tone arm 23 is thus fed directly through the audio-amplifier 94 to the speaker 113.

In the operation of the device as a disk record player, it will also be remembered that the control lever 26 is moved into engagement with the stop 28, thereby to cause rotation of the turntable 16 to rotate the record 19 supported thereon.

If the device is to be operated as a magnetic record player to reproduce a recording from the wire 13, the movable contact arm 95 is moved into engagement with the stationary contact 99; the wire 13 is passed over the transducer head 21 and connected to the combination turntable pick-up spool 16; and the control lever 26 is moved into engagement with the stop pin 28 to cause rotation of the turntable 16 in a clockwise direction as viewed in Figure 1 of the drawings. The magnetic energy on the wire 13 is changed into electrical impulses in the magnetic transducer head 21 and fed through the choke 102, stationary contact 99, movable contact 94 and the audio-amplifier 94 to the speaker 113.

When it is desired to make a magnetic record from an incoming radio program, the switch 95 is moved into engagement with the stationary contact 96, the switch 110 is moved into engagement with the stationary contact 112 and the switch 107 is moved into engagement with its stationary contact 107'. The control lever 26 is also moved into engagement with the stop pin 28 to cause rotation of the combination turntable and take-up spool 16 in a clockwise direction as viewed in Figure 1 of the drawings. After the record has been made, the wire 13 may be rewound on the supply spool 12 by moving the control lever 26 into engagement with stop pin 29 and by opening switches 95, 107 and 110.

A recording may be made from the microphone 101 in the same manner by simply moving the movable contact element 95 into engagement with stationary contact 97 instead of into engagement with stationary contact 96. The phonograph record which is being played by the machine itself may also be simultaneously recorded on the wire by moving the switch 95 into engagement with the stationary contact 98 with the other switches and control lever in the position as described in connection with the recording of the radio program.

From the above description, the extreme versatility of this device will be immediately apparent. The speed of rotation of the turntable 16 is, of course, governed by the conventional speed for which disk records are to be played. The most common speed in use today is 78 revolutions per minute. The speed of travel of the wire 13 across the magnetic transducer head 21 is controlled by governing the depth of the groove 20, or, in other words, the diameter of the bottom of this groove 20. In devices which I have constructed in accordance with the illustrated embodiment of the present invention, the wire speed has been two feet per second for a turntable speed of 78 revolutions per minute.

While I have shown a certain particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A sound reproducing device comprising a supporting plate, a disk record supporting turntable rotatably mounted on said supporting plate, said turntable including a radially outwardly facing channel in the peripheral surface thereof for receiving an elongated magnetic record member, a hub mounted on said plate for rotation about an axis substantially parallel to the axis of rotation of said turntable, said hub being arranged to carry a spool having an elongated record member wound thereon and extending into wind-up engagement with said turntable, an electro-magnetic transducer head mounted between said hub and said turntable for limited back and forth motion along a path substantially parallel to the axes of rotation of said turntable and said hub, a motor, means for selectively driving said turntable or said hub from said motor, means driven from said hub for moving said transducer head back and forth along said path of movement when said hub is rotated, said transducer head lying in the path of movement of said magnetic record member when said record member is being transferred from said spool to said turntable, and a tone arm associated with said turntable for engagement with a disk record when a disk record is supported on said turntable.

2. A sound reproducing device comprising a supporting plate, a disk record supporting turntable rotatably mounted on said supporting plate, said turntable including a radially outwardly facing channel in the peripheral surface thereof for receiving an elongated magnetic record member, a hub mounted on said plate for rotation about an axis substantially parallel to the axis of rotation of said turntable, said hub being arranged to carry a spool having an elongated record member wound thereon and extending into wind-up engagement with said turntable, an electro-magnetic transducer head mounted between said hub and said turntable for limited back and forth motion along a path substantially parallel to the axes of rotation of said turntable and said hub, a motor, means for selectively driving said turntable or said hub from said motor, means driven from said hub for moving said transducer head back and forth along said path of movement when said hub is rotated, said transducer head lying in the path of movement of said magnetic record member when said record member is being transferred from said spool to said turntable, a tone arm associated with said turntable for engagement with a disk record when a disk record is supported on said turntable, one-way brake means associated with said turntable to place a drag on said turntable when said hub is being driven by said motor to wind up said record member on said spool, and one-way brake means associated with said hub to place a drag on said hub when said turntable is being driven to wind up said record member on said turntable.

3. A sound reproducing device comprising a supporting plate, a disk record supporting turntable having a depending shaft rotatably mounted on said supporting plate, said turntable including a radially outwardly facing channel in the peripheral surface thereof for receiving an elongated magnetic record member, a hub having a depending shaft mounted on said plate for rotation about an axis substantially parallel to the axis of rotation of said turntable, said hub being arranged to carry a spool having an elongated record member wound thereon and extending into wind-up engagement with said turntable, an electromagnetic transducer head mounted between said hub and said turntable for limited back and forth motion along a path substantially parallel to the axes of rotation of said turntable and said hub, a motor having a rotatable drive shaft, means for selectively driving said turntable or said hub from said motor drive shaft, means driven by one of said shafts for moving said transducer head back and forth along said path of movement when said one shaft is rotated, said transducer head lying in the path of movement of said magnetic record member when said record member is being transferred from said spool to said turntable, and a tone arm associated with said turntable for engagement with a disk record when a disk record is supported on said turntable.

MARVIN CAMRAS.

REFERENCES CITED

The following references are of record in the file of this patent:

UNITED STATES PATENTS

| Number | Name | Date |
|---|---|---|
| 553,935 | Purdy | Feb. 4, 1896 |
| 578,678 | Seymour | Mar. 9, 1897 |
| 1,555,281 | Engl | Sept. 29, 1925 |
| 1,789,607 | Steurer | Jan. 20, 1931 |
| 1,821,496 | Cohen | Sept. 1, 1931 |
| 1,824,655 | Burk | Sept. 22, 1931 |
| 1,868,613 | Maibohm | July 26, 1932 |
| 1,952,359 | Bosco | Mar. 27, 1934 |
| 1,952,809 | Kuchenmeister | Mar. 27, 1934 |
| 1,974,904 | Von Arco | Sept. 24, 1935 |
| 2,096,805 | Hickman | Oct. 26, 1937 |
| 2,457,699 | Marsen | Dec. 28, 1948 |
| 2,490,771 | Begun | Dec. 13, 1949 |
| 2,509,500 | Howey | May 30, 1950 |

FOREIGN PATENTS

| Number | Country | Date |
|---|---|---|
| 551,550 | Germany | June 2, 1932 |
| 373,585 | Great Britain | Nov. 19, 1932 |
| 247,755 | Switzerland | Dec. 16, 1947 |